(12) United States Patent
Hayashida et al.

(10) Patent No.: US 12,330,085 B2
(45) Date of Patent: Jun. 17, 2025

(54) MODEL PART AND METHOD FOR MANUFACTURING MODEL PART

(71) Applicant: BANDAI CO., LTD., Tokyo (JP)

(72) Inventors: Shoichi Hayashida, Tokyo (JP); Takahiro Makino, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 10 days.

(21) Appl. No.: 17/760,907

(22) PCT Filed: Sep. 10, 2020

(86) PCT No.: PCT/JP2020/034277
§ 371 (c)(1),
(2) Date: Mar. 16, 2022

(87) PCT Pub. No.: WO2021/054239
PCT Pub. Date: Mar. 25, 2021

(65) Prior Publication Data
US 2022/0347590 A1    Nov. 3, 2022

(30) Foreign Application Priority Data
Sep. 19, 2019    (JP) .................................. 2019-170784

(51) Int. Cl.
*A63H 9/00* (2006.01)
*A63H 3/42* (2006.01)
(Continued)

(52) U.S. Cl.
CPC .................. *A63H 9/00* (2013.01); *A63H 3/42* (2013.01); *B29C 67/0007* (2013.01); *B29K 2995/002* (2013.01); *B29L 2031/52* (2013.01)

(58) Field of Classification Search
CPC ......... A63H 9/00; A63H 3/42; B29C 67/0007
See application file for complete search history.

(56) References Cited

U.S. PATENT DOCUMENTS 2,931,136 A * 4/1960 Loewy ..................... A63H 3/36
446/295
3,881,272 A * 5/1975 Parker .................... A01K 85/16
43/42.34
(Continued)

FOREIGN PATENT DOCUMENTS

| CN | 109939448 A * | 6/2019 | ............... A63H 9/00 |
| EP | 1892025 A1 * | 2/2008 | ............... A63H 3/38 |

(Continued)

OTHER PUBLICATIONS

Translation CN109939448A (Year: 2019).*
(Continued)

*Primary Examiner* — Eugene L Kim
*Assistant Examiner* — Alyssa M Hylinski
(74) *Attorney, Agent, or Firm* — Alston & Bird LLP

(57) ABSTRACT

[Problem] To provide: a model component having stable quality and having gradation; and a production method therefor [Solution]A model component having: a first layer formed using a first material having a first color; and a second layer that covers at least part of the first layer and comprises a second material having a second color that is different from the first color. The second layer includes a region having a thickness in at least one section that is less than other sections. The region includes a section in which the first layer is exposed to the surface of the second layer.

9 Claims, 6 Drawing Sheets

(51) Int. Cl.
*B29C 67/00* (2017.01)
*B29L 31/52* (2006.01)

(56) References Cited

U.S. PATENT DOCUMENTS

| | | | | | |
|---|---|---|---|---|---|
| 4,629,442 | A | * | 12/1986 | Samo | A63H 3/38 446/389 |
| 4,637,159 | A | * | 1/1987 | Kulis | B29D 11/02 623/4.1 |
| 5,540,612 | A | * | 7/1996 | Mendez | A63H 3/38 623/4.1 |
| 5,913,708 | A | | 6/1999 | Gross | |
| 6,811,461 | B2 | * | 11/2004 | Maddocks | A63H 3/38 446/341 |
| 8,303,746 | B2 | * | 11/2012 | Friel | A61F 2/141 623/4.1 |
| 2008/0017639 | A1 | * | 1/2008 | Wu | B65D 1/265 220/23.87 |
| 2013/0079174 | A1 | * | 3/2013 | Gill | A63B 53/14 156/245 |

FOREIGN PATENT DOCUMENTS

| | | | | |
|---|---|---|---|---|
| EP | 2269794 A1 | * | 1/2011 | ............ B29B 11/16 |
| JP | 8-447585 A | | 2/1996 | |
| JP | 9-192356 A | | 7/1997 | |
| JP | 2009-247798 | | 10/2009 | |
| JP | 2017-169801 A | | 9/2017 | |
| JP | 6561191 B1 | | 7/2019 | |
| JP | 2019-136389 A | | 8/2019 | |
| KR | 101475680 B1 | * | 2/2015 | |
| KR | 101495680 B1 | * | 2/2015 | |
| WO | WO-2017163556 A1 | * | 9/2017 | ............... A63H 3/42 |
| WO | WO 2021/054239 A1 | | 3/2021 | |

OTHER PUBLICATIONS

Translation KR101495680B1 (Year: 2015).*
Translation WO2017163556A1 (Year: 2017).*
PCT/JP2020/034277 International Search Report, mailed Nov. 10, 2020, English translation.
Bandai Spirits, "Figure-riseLABO," retrieved from https://bandaihobby.hatenablog.com/entry/2019/08/26/180000, dated Aug. 26, 2019.

* cited by examiner

[FIG. 1]
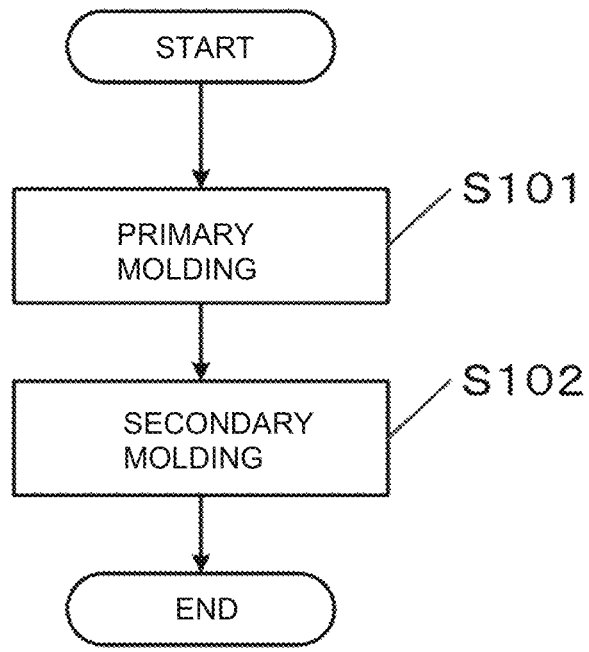

[FIG. 2]
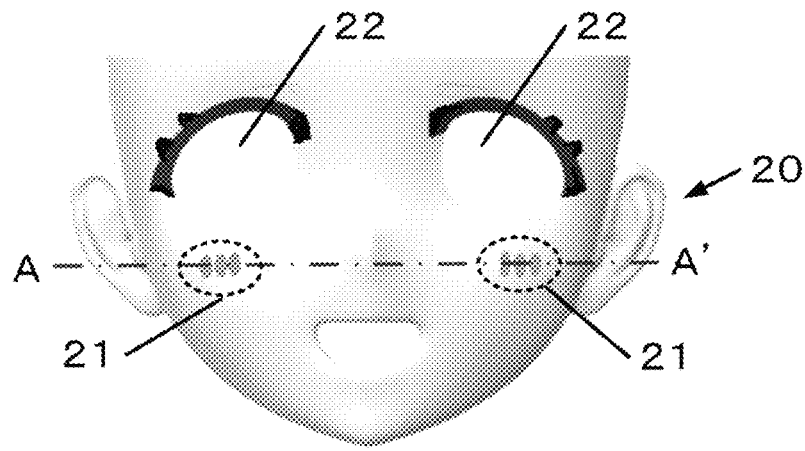
(A)
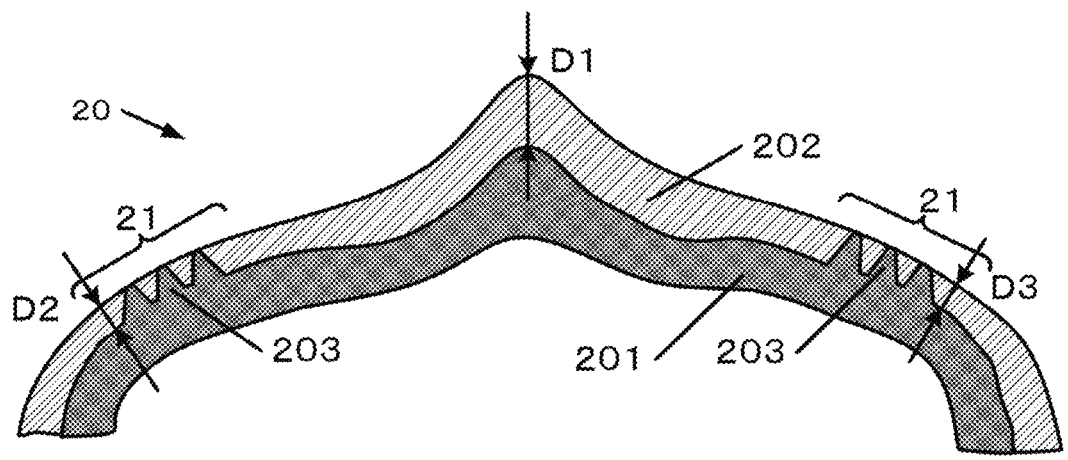
(B)
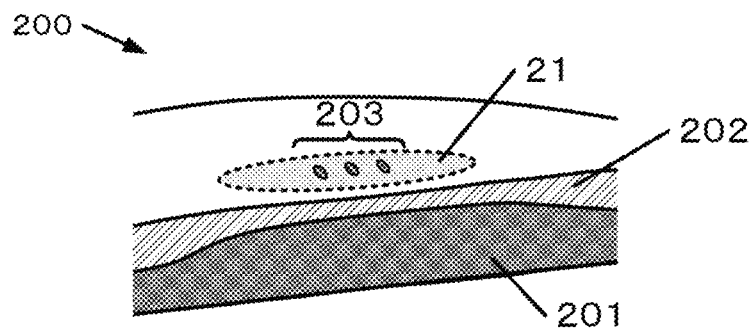
(C)

[FIG. 3]
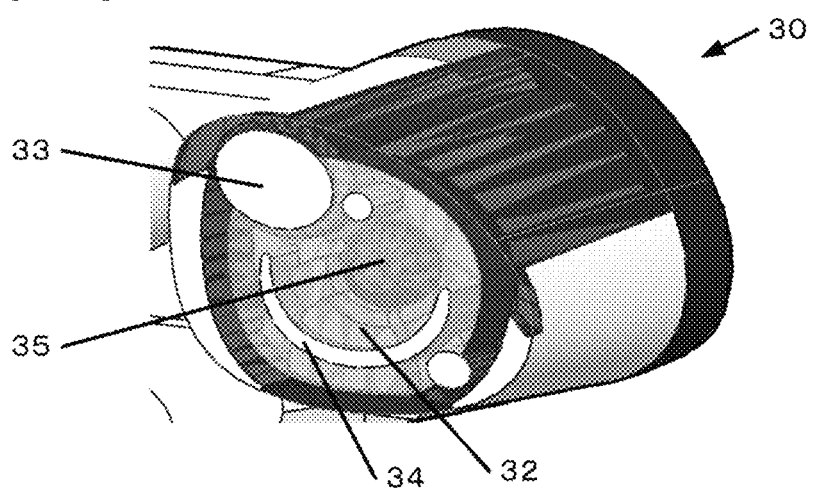

[FIG. 4]
(A) 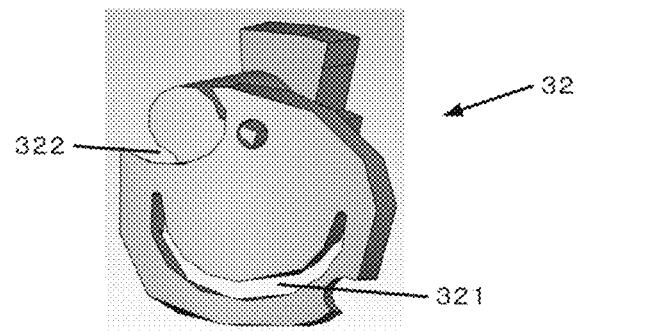
(B) 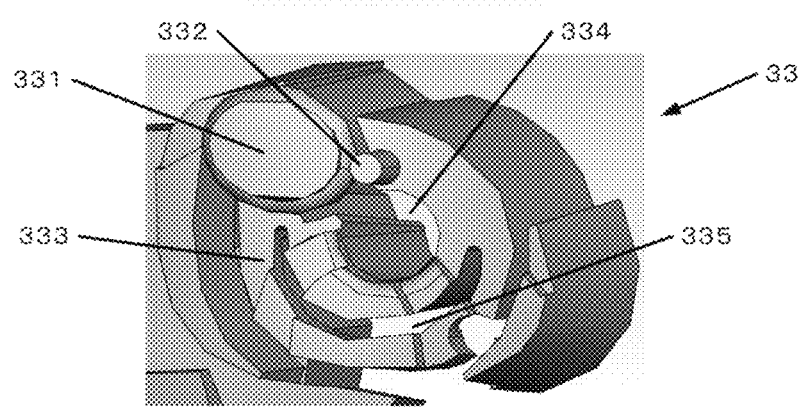
(C) 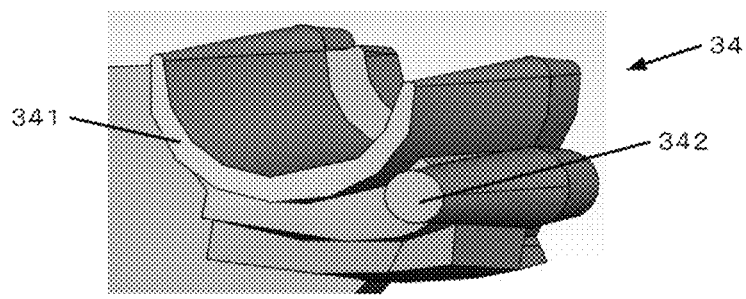
(D) 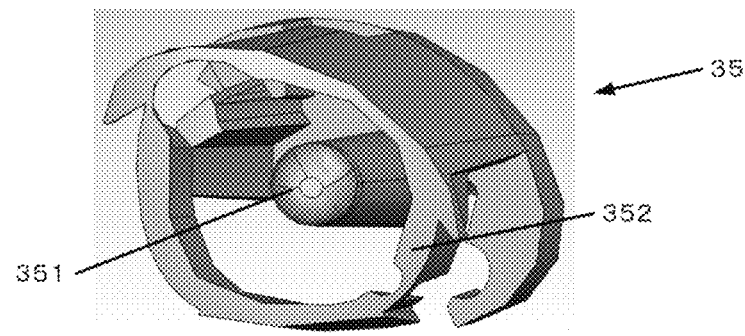

[FIG. 5]
(A)
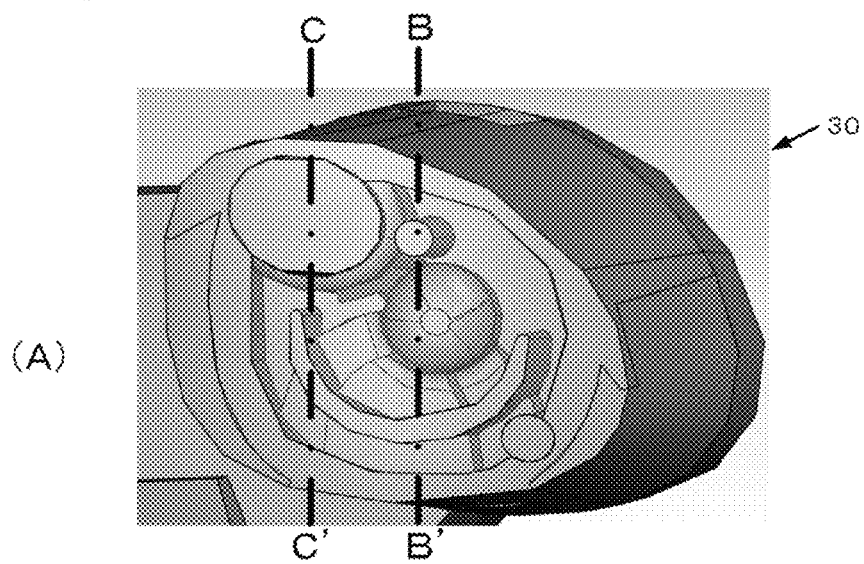
(B)
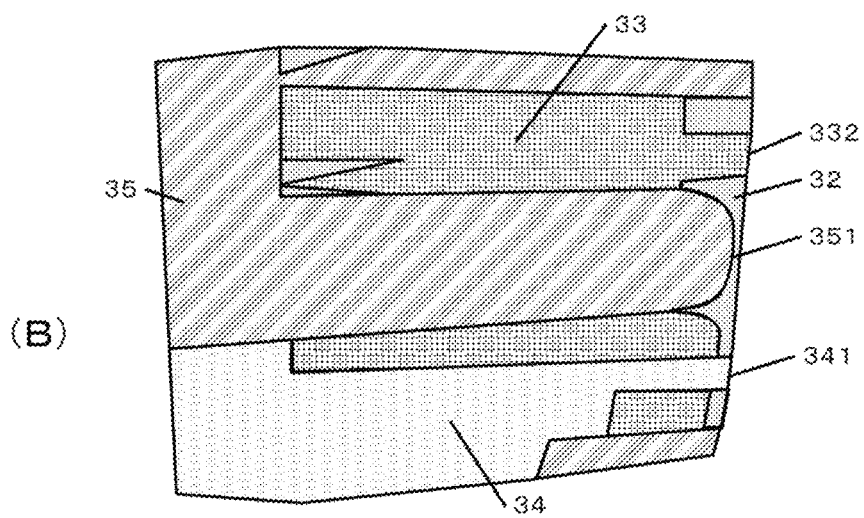
(C)
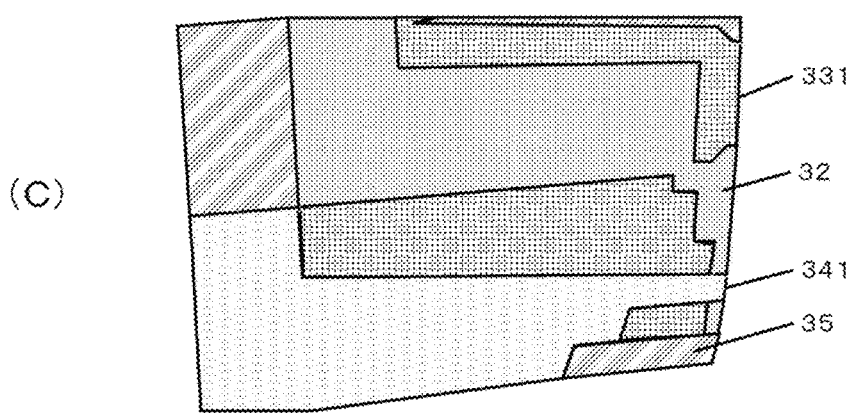

[FIG. 6]
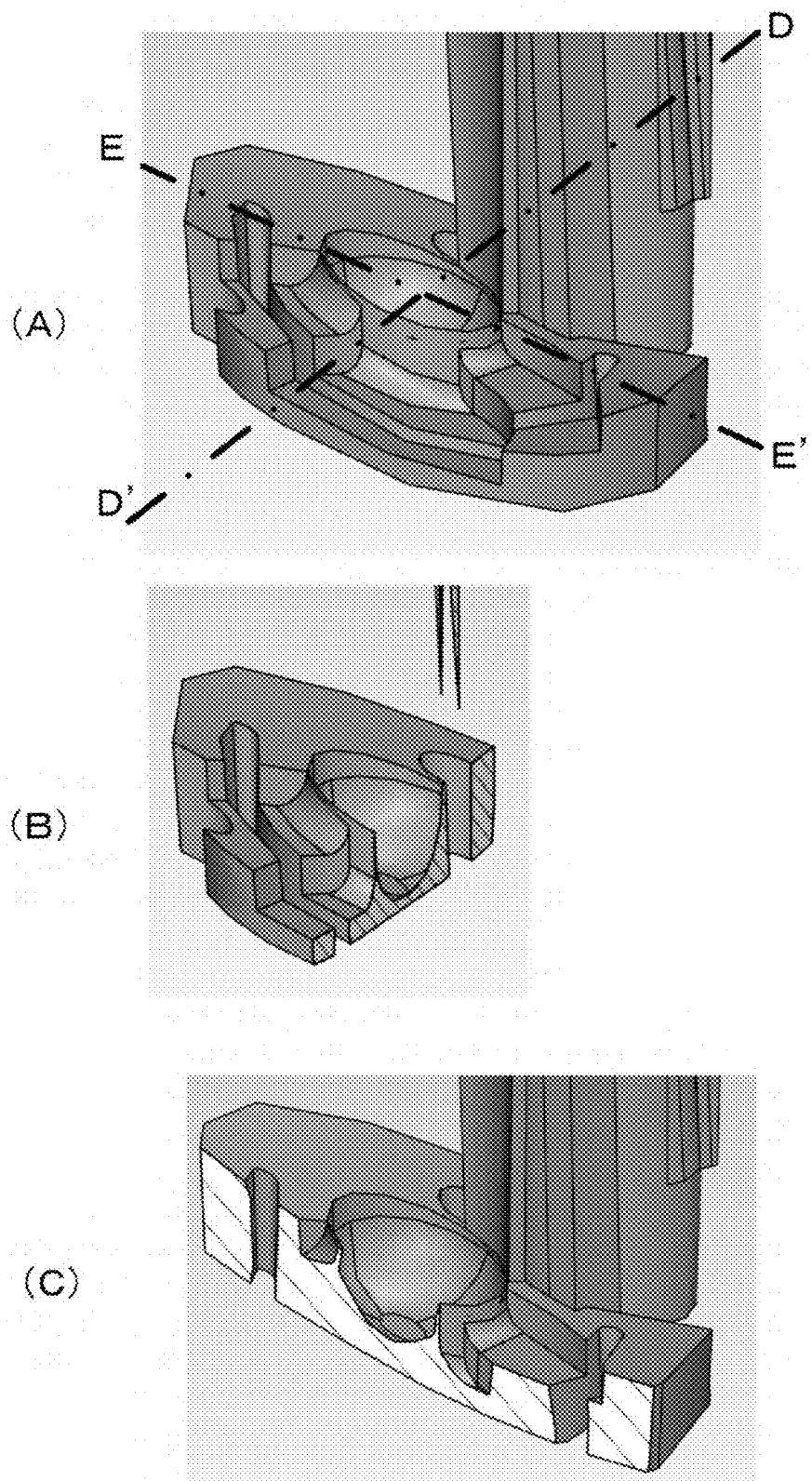

MODEL PART AND METHOD FOR MANUFACTURING MODEL PART

CROSS REFERENCE TO RELATED APPLICATIONS

This application is a national stage application, filed under 35 U.S.C. § 371, of International Application No. PCT/JP2020/034277, filed Sep. 10, 2020, which claims priority to Japan Application No. 2019-170784, filed Sep. 19, 2019, the contents of both of which as are hereby incorporated by reference in their entirety.

BACKGROUND

Technical Field

The present invention relates to a model part and a method for manufacturing the model part.

Description of Related Art

When a part of an assembly model, known as a plastic model, such as a face of a toy, is painted, each portion of the part is manually painted or the painting is performed using a spray on the part covered by a mask having an opening portion at a portion to be colored (see Patent Document 1). Furthermore, automated painting using a coloring device including a plurality of printers and a conveyer has been proposed (see Patent Document 2).

Patent Document 1: Utility Model Application Publication No. H3-34226

Patent Document 2: Patent Application Publication No. H8-47585

BRIEF SUMMARY

Problem to be Solved by the Invention

Nevertheless, a certain level of skill is required for providing gradation with color gradually darkening, meaning that stable quality is difficult to attain. Furthermore, the use of the coloring device for the painting involves a problem in that additional investment in equipment and larger equipment are required.

An object of the present invention is to provide a model part provided with gradation with stable quality, and a method for manufacturing the same.

Solution to the Problem

The present invention for solving the problem described above relates to a model part including:

a first layer formed by a first material having a first color; and a second layer that covers at least a part of the first layer, and is formed by a second material having a second color different from the first color, wherein the second layer includes a region in which at least one portion has a thickness smaller than other portions, and the region includes a portion where the first layer is exposed on a surface of the second layer.

Advantageous Effects of the Invention

With the present invention, a model part provided with gradation with stable quality, and a method for manufacturing the same can be provided.

BRIEF DESCRIPTION OF THE FIGURES

FIG. 1 is a flowchart illustrating one example of a method for manufacturing a model part according to an embodiment;

FIG. 2 is a diagram illustrating one example of a structure of a model part according to a first embodiment;

FIG. 3 is a diagram illustrating one example of a structure of a model part according to a second embodiment;

FIG. 4 is a diagram illustrating another example of the structure of the model part according to the second embodiment;

FIG. 5 is a diagram illustrating one example of a cross-sectional structure of the model part according to the second embodiment; and FIG. 6 is a diagram illustrating another example of a cross-sectional structure of the model part according to the second embodiment.

DETAILED DESCRIPTION OF VARIOUS EMBODIMENTS

Exemplary embodiments of the invention will be described below with reference to the drawings. In the drawings, the same elements are denoted with the same reference numeral. In the drawings, the upper, lower, left, and right directions in the drawings relative to the sheet surface are used in the description of this document as the upper, lower, left, and right direction of a part in the embodiments. In the embodiments of the present invention described below, polystyrene is used as an example of a molding material, but this should not be construed in a limiting sense and does not exclude the use of other materials (such as polyethylene, thermoplastic resin such as ABS, thermosetting resin, and metal).

First Embodiment

First of all, a method for manufacturing a model part according to an embodiment of the invention will be described with reference to a flowchart in FIG. 1. In S101, primary molding is performed for forming a primary molding layer constituting a skeleton portion of the model part. As a molding material for the primary molding layer, general purpose polystyrene (GPPS) or high impact polystyrene (HIPS) can be used. Next, in S102, secondary molding is performed for forming a secondary molding layer over the primary molding layer to cover the primary molding layer. As a molding material for the secondary molding layer, Kyouka polystyrene (KPS) can be used. The secondary molding layer, forming the outer surface of the model part, has a thickness varying among portions, and its portion formed to be thin is formed such that it is thin enough to allow the color of the primary molding layer formed thereneath to be seen therethrough. The primary molding layer is exposed on the surface of the secondary molding layer at a part of the portion formed to be thin.

In the process described above, the molding material of the primary molding layer and the molding material of the secondary molding layer are different from each other at least in color. The primary molding layer may have a darker color than the secondary molding layer. For example, when the model part forms the face or a body part of a doll, the primary molding layer may have a dark skin color or may have dark orange color, dark pink color, or the like, while the secondary molding layer forming the surface has a skin color. As described above, in the present embodiment, the primary molding layer and the secondary molding layer are formed by molding materials having different colors, and the secondary molding layer is formed to be thin to allow the primary molding layer having a different color formed therebeneath to be seen therethrough, whereby gradation can be expressed.

A common molding material may be used for the molding layers, for making the primary molding layer and the secondary molding layer bonded with each other to be integrated. In the example described above, KPS, GPPS, and HIPS which are different from each other in property but polystyrene is used as the common material. A material other than polystyrene, such as ABS resin or polyethylene (PE) may be commonly used. For some layers, a different raw material may be used.

The method for manufacturing the model part described above including at least the two-stage molding processes can be implemented using a multi-color molding device, for example. In each of the molding processes, a mold corresponding to the process is used. Specifically, the molding material is poured into a runner groove of the mold and a molding space (cavity) for forming each part to form a molding object, and after cooling, the molding object is taken out from the mold. The molding objects made by the primary molding are each attached to a mold for the subsequent molding process, to be subjected to the secondary molding. Although FIG. 1 illustrates an example where the number of processes is two, this number of processes is merely for the purpose of description, and an additional molding process may be provided before the primary molding or after the secondary molding. Since the molding method using the multi-color molding device itself is well known, more detailed descriptions thereof will be omitted.

FIG. 2 is a diagram illustrating one example of a structure of the model part manufactured with the manufacturing method illustrated in FIG. 1. FIG. 2(A) is a diagram illustrating one example of a model part 20 that is a part of a face of a doll toy, produced by the two-stage molding processes according to the present embodiment. Cheek regions 21 below the eyes of the model part 20 include exposed portions where the primary molding layer expresses redness. The regions 21 are located at the positions of the left and right cheeks. Holes 22 are insertion holes in which model parts corresponding to the eyes are inserted, the structure of which will be described in the second embodiment.

FIG. 2(B) is a cross-sectional view illustrating an example of a cross section of the region 21 of the model part 20 taken along line A-A'. As can be seen in the cross-sectional view, a secondary molding layer 202 is formed to cover a primary molding layer 201, has a surface on which recesses and protrusions are formed, and has a thickness varying among positions. The secondary molding layer 202 is a molding layer forming the surface of the model, and has a surface corresponding to the desired outer shape of the model. Since the model part 20 is a part of the face of a doll toy, the recesses and protrusions on the secondary molding layer represent a nose, the cheeks, and the like.

The primary molding layer 201, as compared with the secondary molding layer 202, is configured to include a portion having a similar shape relative to the secondary molding layer 202 (shape as a result of downsizing the secondary molding layer 202) and a portion not having the similar shape. In the portion of the primary molding layer 201 having the similar shape, the thickness of the secondary molding layer 202 is maintained at a predetermined value. On the other hand, the non-similar shape portion is raised beyond the similar shape portion (to form a protruding shape), resulting in the secondary molding layer 202 being formed to have a thickness smaller than the predetermined value thereat. The predetermined value corresponds to the smallest possible thickness, of the secondary molding layer, enabling the color of the primary molding layer to be invisible through the secondary molding layer. The portion of the secondary molding layer 202 corresponding to the region 21 is particularly thin, and has a protrusion 203 formed in the primary molding layer 201. The protrusion 203 has a distal end exposed on the surface of the secondary molding layer 202, to express the redness of the cheek in the region 21.

It can be seen that that the thickness of the secondary molding layer 202 varies among portions of the model part 20. For example, thicknesses D1, D2, and D3 satisfy the relationship D1>D2≈D3. This D1 is a thickness (corresponding to the thickness of the predetermined value described above) in the region where the primary molding layer 201 cannot be seen through the surface of the secondary molding layer 202. D2 and D3 are each a thickness of the thinnest portion in the region in which the primary molding layer 201 can be seen through the surface of the secondary molding layer 202. D2 and D3 may be any thickness of a value smaller than the predetermined value D1.

In the present embodiment, the numerical values of D1, D2, and D3 may be defined as D1=d1 (for example, 1 millimeter) and D2=D3=d2 (for example, 0.5 millimeters). Still, it should be noted that these are merely an example, and the values d1 and d2 may be smaller or larger than those described above depending on the property (transparency) of the raw material used. Alternatively, to make the transparency of the under layer vary among portions, different thinnest values in the region may be set. For example, D2 and D3 may be set to be 0.5 millimeters and 0.7 millimeters, respectively.

The secondary molding layer 202 thus formed to be locally thin, enables the coloring of the primary molding layer 201, positioned on the inner side of the secondary molding layer 202, to be seen through the secondary molding layer 202, from the outside of the model part 20. Furthermore, with the protrusion 203 formed in the primary molding layer 201, the color of the primary molding layer can be directly exposed on the surface of the model part 20.

Under this condition, by adjusting the size of the distal end portion of the protrusion 203 exposed on the surface of the model part 20 as well as the number and the arrangement of the protrusions 203, the surface of the model part 20 can be provided with desired color expression. For example, with a large number of protrusions having small distal end portions densely arranged, rouge on the cheek can be expressed.

FIG. 2(C) is a diagram illustrating a case where the color of the primary molding layer 201 can be observed through the secondary molding layer 202, from the outside of the model part 20. As illustrated in FIG. 2(C), the region 21 is formed at a position where the secondary molding layer 202 is formed to be thin. The protrusion 203 formed in the primary molding layer 201 can also be recognized from the outside of the model part 20.

Under this condition, in the region 21, the thickness of the secondary molding layer 202 changes from d2, the thinnest value, to d1 with which the underlayer cannot be seen through. Thus, the color in the region 201 gradually lightens from that at the thinnest value portion where the color of the primary molding layer 201, which is the underlayer, can be most darkly observed, to the color of the secondary molding layer 202, enabling an observer to observe the gradation on the surface of the model part 20.

How the gradation is observed can be changed by changing how d2 changes to d1. For example, how the dark color transitions to a light color changes depends on whether the rate of a change in the thickness is high or low, whereby various gradations can be expressed. For example, if the dark color is desired to locally appear, the thickness may change suddenly from d2 to d1. On the other hand, if transition from the dark color to the color of the raw material of the secondary molding layer 202 through a light color is desired, the thickness may gradually change from d2 to d1. Under an assumed condition where the thickness in a circular region increases in the radial direction from the center which is the position with the thickness d2, to be the thickness d1 at a position separated from the center by a radius r, the gradual change occurs if the radius r is large, and the sudden change occurs if the radius r is small.

The value d1 is uniquely determined for the same molding materials, but the value d2 can be variable. Thus, the value d2 may be changed depending on the type of gradation to be expressed. When the color to be expressed in the region to be provided with the gradation may be of a value smaller than the darkest value, the value d2 may be set to be 0.7 millimeters instead of 0.5 millimeters for example.

Although the color of the raw material used in the secondary molding is a single color in the described case, raw materials of a plurality of colors may be layered to be used. For example, while, a case is described where the color of the secondary molding layer forming the surface of the doll toy is a skin color and the color of the primary molding layer is orange or pink in the embodiment described above, a black color layer may be further formed below the primary molding layer for providing shading. In this case, how the shading is provided may be adjusted by adjusting the thickness of the layer as in the embodiment described above.

Second Embodiment

Next, the second embodiment will be described. The first embodiment is described above in association with the regions of the cheeks below the eyes as parts of the face of a doll toy. The following description, on the other hand, is given in association with the eyes that are parts of the face.

The model toy of the present embodiment is a structure of the eyes that are inserted in the insertion holes 22 of the face of the doll toy illustrated in FIG. 2(A). FIG. 3(A) is a diagram illustrating one example of the outer appearance of a structure 30 of the eye. The structure 30 has a colored transparent lens member 32, facing the front side of the model toy 20, through which the interior of the structure 30 can be seen through. From a part of the lens member 32, glossy members 33 and 34 for expressing the glossiness of the pupil are exposed. A pupil member 35 is arranged on the inner side of the lens member 32. The lens member 32 is formed by a transparent material having, for example, an orange color. The darkness of the color recognized from the outside varies depending on the thickness of the lens member 32. For example, a thick portion is recognized to have a darker orange color.

As the molding material (raw material) of the lens member 32, for example, transparent (or semitransparent) general purpose polystyrene (GPPS) can be used. As the molding material for the molding layers of the glossy members 33 and 34 and the pupil member 35, opaque polystyrene (PS) or Kyouka polystyrene (KPS) can be used.

This is applied to the flowchart illustrated in FIG. 1 described in the first embodiment as follows. Specifically, in the present embodiment, in S101, the molding layers of the glossy members 33 and 34 and the pupil member 35 are sequentially formed, using the opaque polystyrene (PS) or Kyouka polystyrene (KPS), as the primary molding layer. The layers are formed using respective molding materials of different colors, and thus are each molded by a molding process for the molding material, but are collectively referred to as the primary molding layer for the sake of simplicity. Then, over the primary molding layer, the lens member 32 is molded, using general purpose polystyrene (GPPS), as the secondary molding layer to cover the molding layers at least partially.

FIG. 4 is a diagram illustrating each of the members forming the structure 30 individually. FIG. 4(A) illustrates the structure of the lens member 32. The lens member 32 is provided with openings 321 and 322 for exposing the glossy members 33 and 34 on the surface, and its thicknesses is formed to vary.

FIG. 4(B) illustrates a structure of the glossy member 33. The glossy member 33 is configured to include portions 331 and 332 exposed on the surface of the lens member 32, another portion 333 positioned on the inner side of the lens member 32, and the like. The portion 333 positioned on the inner side of the lens member 32 has a shape (including a flat portion, a step, and a recessed portion) corresponding to the shape of the inner side of the lens member 32. This shape defines the thickness of the lens member 32. A hole 334 through which the pupil member 35 penetrates is provided at the center of the glossy member 33. The glossy member 33 is provided with a hole 335 through which a glossy member 34 penetrates. The glossy member 33 can be formed by an opaque material having a white color, for example.

FIG. 4(C) illustrates a structure of the glossy member 34. The glossy member 34 is configured to include protrusion portions 341 and 342 penetrating the glossy member 33 and the lens member 32 to be exposed on the surface of the lens member 32, and can be formed by an opaque material having a color (yellow color, for example) different from that of the glossy member 33.

FIG. 4(D) illustrates a structure of the pupil member 35. The pupil member 35 is configured to include a protrusion portion 351 that penetrates through the hole 334 of the glossy member 33. The protrusion portion 351 has an end portion covered by the lens member 32. The pupil member 34 may include a member 352 forming the contour of the eye. The pupil member 34 can be formed by an opaque material having a color (for example, black color) different from those of the glossy members 33 and 34.

FIG. 5(A) illustrates the structure in which the members illustrated in FIGS. 4(A) to 4(D) are coupled to each other. FIG. 5(B) is a cross-sectional view illustrating an example of a cross section of the structure 30 taken along line B-B' in FIG. 5(A). As can be seen in the cross-sectional view, the lens member 32 has the thickness varying among portions, so that the color shading of the pupil can be expressed. For example, the thickness of the lens member 32 gradually decreases around the end portion of the protrusion portion 351 of the pupil member 35, resulting in the raw material color (orange color) gradually lightening and the color of the pupil member 35 gradually darkening.

The lens member 32 is formed to be thick around the protrusion portion 332 of the glossy member 33 exposed on the surface of the lens member 32, and to be thin around the protrusion portion 341 of the glossy member 34 exposed on the surface of the lens member 32. With the thickness of the lens member 32 thus changed around the protrusion portions, the gradation within the pupil can be expressed.

FIG. 5(C) is a cross-sectional view illustrating an example of a cross section of the structure 30 taken along line C-C' in FIG. 5(A). As can be seen in the cross-sectional view, the thickness of the lens member 32 is continuously changing at the position around the protrusion portion 331 of the glossy member 33 exposed on the surface of the lens member 32. Specifically, the thickness is small around the protrusion portion 331 and gradually increases toward the outer side. This results in gradation provided around the contour of the portion of the protrusion portion 331 exposed on the surface of the lens member 32. Thus, the visual effect of blurring the contour of the portion can be expected to be obtained.

With the thickness of the lens member 32 varying to be increased (reduced) stepwise or gradually, the color shading of the pupil can be expressed.

Next, a structure of the lens member 32 on the back side will be described with reference to FIG. 6. FIG. 6(A) illustrates one example of the structure of the lens member 32 on the back side. FIG. 6(B) is a cross-sectional view illustrating an example of a cross section of the lens member 32 taken along line C-C' in FIG. 6(A). FIG. 6(C) is a cross-sectional view illustrating an example of a cross section of the lens member 32 taken along line D-D' in FIG. 6(A). As can be seen in the cross-sectional views, the thickness of the lens member 32 varies among portions, and a change in the thickness includes a stepwise change and a continuous gradual change.

With the present embodiments as described above, a model part provided with gradation with stable quality and a method for manufacturing the same can be provided.

The invention claimed is:

1. A model part comprising:
   a first layer comprising a first material having a first color, the first layer including a plurality of protrusions in a first region;
   a second layer that covers at least a portion of the first layer, wherein the second layer comprises a second material having a second color different from the first color;
   a third layer comprising a third material having a third color, the third layer including a first protrusion portion that is exposed by extending through a surface of the first layer and is covered by the second layer; and
   a fourth layer comprising a fourth material having a fourth color, the fourth layer including a second protrusion portion that penetrates the first layer and the second layer to be exposed on a surface of the second layer, wherein:
   the second layer has a varying thickness over an area covering at least the portion of the first layer such that the area covering the first region has a thickness smaller than other portions of the area covering at least the portion of the first layer,
   each protrusion of the plurality of protrusions comprises a distal end that is exposed on a surface of the model part by extending through the second layer,
   the model part is a part of an eye of a doll, and
   the first color is an opaque color and the second color is a transparent color.

2. The model part according to claim 1, wherein a plurality of the other portions are arranged adjacent to the first region.

3. The model part according to claim 1, wherein a surface of the first layer in contact with the second layer has a structure including a step or a recess portion, and the thickness of the second layer changes in accordance with the structure.

4. The model part according to claim 1, wherein
   the thickness of the second layer at an end portion of the first protrusion portion is different from the thickness around the end portion of the first protrusion portion.

5. The model part according to claim 1, wherein the third color and the fourth color are opaque colors different from the first color.

6. The model part according to claim 1, wherein a thickness of the second layer around the first protrusion portion and a thickness of the second layer around the second protrusion portion are different from each other.

7. The model part according to claim 1, wherein the plurality of protrusions in the first region are configured to represent a glossiness of at least a portion of the eye of the doll.

8. The model part according to claim 1, wherein the first A protrusion portion of the third layer is a circular shape to represent a pupil of the eye of the doll.

9. A method for manufacturing a model part, the method comprising:
   molding a first layer using a first material having a first color, the first layer including a plurality of protrusions in a first region;
   molding a second layer using a second material having a second color different from the first color, to cover at least a portion of the first layer;
   molding a third layer using a third material having a third color, the third layer including a first protrusion portion that is exposed on a surface of the first layer and is covered by the second layer; and
   molding a fourth layer using a fourth material having a fourth color, the fourth layer including a second protrusion portion that penetrates the first layer and the second layer to be exposed on a surface of the second layer, wherein
   the second layer is molded to define a varying thickness of the second layer over an area covering at least the portion of the first layer such that the area covering the first region is thinner than other portions of the area covering at least the portion of the first layer, and
   each protrusion of the plurality of protrusions comprises a distal end that is exposed on a surface of the model part by extending through the second layer,
   the model part is a part of an eye of a doll, and
   the first color is an opaque color and the second color is a transparent color.

\* \* \* \* \*